United States Patent [19]

Tonomura

[11] 4,395,051
[45] Jul. 26, 1983

[54] QUICK-CHANGE HOLDER
[75] Inventor: Takashi Tonomura, Toyama, Japan
[73] Assignee: Kabushiki Kaisha Fujikoshi, Toyama, Japan
[21] Appl. No.: 232,417
[22] Filed: Feb. 6, 1981
[30] Foreign Application Priority Data
  Feb. 21, 1980 [JP] Japan .............................. 55-20381[U]
[51] Int. Cl.³ .............................................. B23B 31/22
[52] U.S. Cl. ..................... 279/75; 279/1 B; 279/22; 279/82; 285/316
[58] Field of Search ..................... 279/1 B, 22, 30, 72, 279/75, 82; 285/316, 277; 403/322

[56] References Cited
U.S. PATENT DOCUMENTS

| | | | |
|---|---|---|---|
| 1,119,276 | 12/1914 | Griffith et al. | 279/75 |
| 2,673,750 | 3/1954 | Scheiwer | 285/277 |
| 2,970,844 | 2/1961 | Better | 279/75 |
| 3,266,825 | 8/1966 | Magorien | 285/277 |
| 4,275,893 | 6/1981 | Bilanceri | 279/75 X |

Primary Examiner—Z. R. Bilinsky
Attorney, Agent, or Firm—Spencer & Kaye

[57] ABSTRACT

A quick-change holder for a machine tool wherein a nut holding a tool can be attached and detached by a single action. In the quick-change holder of the type, in which the nut charged with the tool can be attached to and detached from a holder body by the radial movements of a plurality of balls which are so loosely fitted in a plurality of radial through-holes formed in the holder body as to be made movable in the radial direction, according to the present invention, the aforementioned holder body is formed with an outwardly diverging conical inner circumference in which a spring having free wire ends with a gap therebetween so as to be compressible radially inwardly is fitted under radially inward compression in an inscribed relationship therewith, and the aforementioned spring is brought into abutment engagement with the balls, when the nut is not inserted, thereby to push the balls outwardly in the radial direction.

3 Claims, 7 Drawing Figures

4,395,051

QUICK-CHANGE HOLDER

BACKGROUND OF THE INVENTION

1. Field of the Invention

The present invention relates to a quick-change holder for a machine tool, in which an adaptor holding a tool is attached to and detached from a body fixed to the spindle of the machine tool, and more particularly to a quick-change holder of such single-action type as can have its nut attached and detached easily by one hand.

2. Description of the Prior Art

A quick-change holder according to the prior art is made to have such a construction as is shown in FIG. 1 (PRIOR ART). As shown, a nut loaded with a tool can be attached to and detached from a holder body by the radial movements of a plurality of balls which are mounted in radial through holes formed in the body.

When the aforementioned adaptor is removed, however, the condition is shown in FIG. 2, in which the balls restore their initial positions shown in FIG. 1 and are blocked by the smaller diameter portion of the inner circumference of the sleeve being urged by the action of a spring so that they cannot move outwardly in the radial direction. Therefore, the nut cannot be inserted into the holder body before the sleeve is moved leftwardly against the action of the spring so that the balls are set free and escaped onto the larger diameter portion of the inner circumference of the sleeve.

SUMMARY OF THE INVENTION

It is therefore an object of the present invention to provide an improved quick-change holder which succeeds in solving the problems concomitant with the quick-change holder according to the prior art and which can mount and demount a nut holding a tool by a single action.

This and other objects to be described hereinlater can be attained by the quick-change holder according to the present invention, comprising: a cylindrical body of sleeved shape having its one end to be fixed to the spindle of a machine tool and formed with both a plurality of radial through holes, which are arranged in a circumferential direction thereof, and a center bore wbhich extends in the axial direction thereof; a plurality of balls loosely fitted in said radial through holes, respectively, and having a larger diameter than the radial thickness of said cylindrical body at the circumferential portion where said radial through holes are arranged; a nut which can be inserted into the center bore of said cylindrical body at the other end thereof opposite to said spindle and to which an adaptor to be coupled in a driving power transmitted relationship to said spindle can be attached, said nut having its outer circumference formed with a circumferential groove, with and from which said balls can engage and disengage, so that said balls are brought into engagement with said circumferential groove when said nut is inserted into said circumferential body; and a sleeve mounted on said cylindrical body such that it encloses said cylindrical body and such that it can move in the axial direction and urged uni-directionally in the axial direction by means of a spring, said sleeve having its inner circumference which is made engageable with said balls and which is composed of portions having larger and smaller diameters, wherein said sleeve is axially moved against the action of said spring so that said balls are moved outward in the radial direction from the smaller diameter portion to the larger diameter portion of said inner circumference thereby to bring said balls into and out of free engagement with said circumferential groove whereby said nut can be mounted on and demounted from said cylindrical body, wherein the improvement resides: in that the portion of said cylindrical body, which merges into said radial through holes and which is located at the side of said spindle, is formed with a conical inner circumference which diverges to the outside; and in that a spring having free wire ends with a gap therebetween so as to be compressible inwardly in the radial direction and which can be brought into abutment engagement with the conical inner circumference of said cylindrical body, is fitted in contact with said conical inner circumference, whereby the second-named spring made engageable with said conical inner circumference is brought into abutment engagement, when said nut is not inserted, with those portions of said balls, which protrude inwardly from said radial through holes, thereby to push said balls outwardly in the radial direction and is thrusted, when said nut is inserted, by the leading end of said nut at the side of said spindle so that it is released from engagement with said balls until it is positioned on the inner conical circumference of said cylindrical body.

In a preferred embodiment, the aforementioned spring made engageable with the conical inner circumference of the cylindrical body may be a partially cut-off ring spring which may preferably have an internal diameter smaller than the external diameter of the leading end portion of the aforementioned nut at the side of the spindle. Thus, when the aforementioned nut is inserted into the cylindrical body, the ring spring can be moved axially along the aforementioned conical inner surface in a simple and reliable manner.

Since the balls are retained outwardly in the radial direction by the arrangements according to the present invention thus far described even when the nut is removed, this nut can be inserted without any requirement for the movement of the sleeve.

BRIEF DESCRIPTION OF THE DRAWINGS

The present invention will be more fully understood by reference to the following detailed description thereof when read in conjunction with the attached drawings wherein like reference numerals refer to like elements and wherein.

DETAILED DESCRIPTION OF THE PREFERRED EMBODIMENTS

Figure 1:
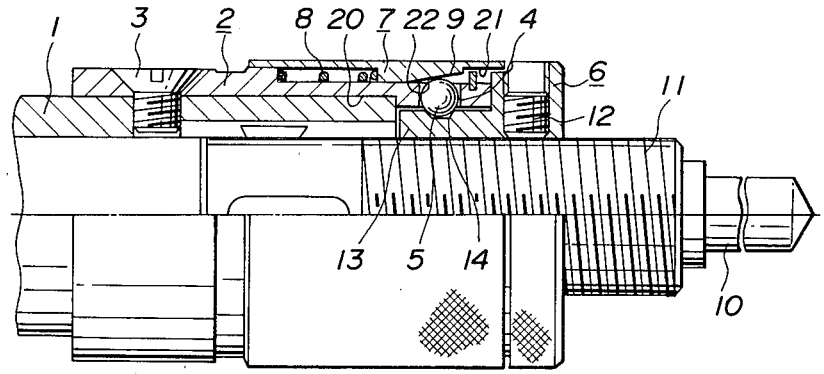
FIG. 1 (PRIOR ART) is a longitudinally sectional side elevation showing the essential portion of a quick-change holder according to the prior art.

FIG. 1 shows the quick-change holder according to the prior art. As shown in FIG. 1, there is fixed to the spindle 1 of a machine tool by means of attaching bolts 3 a cylindrical holder body 2 of sleeved shape, which is formed with a center bore 20, at one end thereof. The cylindrical holder body 2 is formed at its other free or open end with a plurality of radial through holes 4 which are arranged in a circumferential direction thereof and in which a plurality of balls 5 having a larger diameter than the radial thickness of the portion of the cylindrical holder body 2 formed with the radial through holes 4 are freely fitted. A nut 6 can have its end portion inserted into the free end of the holder center bore 20 at the righthand end thereof, as viewed in the drawing. Each of the radial through holes 4 is made to have a smaller diameter at its radially inner portion than the diameter of the balls 5 so that the corresponding ball 5 is prevented from coming out through that radially inner portion of the radial through hole 4 when the nut 6 is removed. A sleeve 7 is fitted on the circumference of the cylindrical holder body 2 such that the former encloses the latter and can move in the axial direction. The sleeve 7 thus fitted is axially urged toward the open end of the holder body 2 at all times by the action of a coil spring 8 which is held under compression between itself and the holder body 2. Moreover, the sleeve 7 is formed with a conical inner circumference 9, which is composed of portions 21 and 22 having larger and smaller diameters while being shaped to diverge toward the open end thereof, and which can contact with the balls 5. Into the threaded inner circumference of the nut 6 which is also made to have a cylindrical shape, there is axially movably screwed an adjustable adaptor 11 which is formed with an externally threaded outer circumference and which is used to hold a tool 10 such as a drill. Thus, the adaptor 11 is positioned at an axially suitable position by a nut 12 so that it is made integral with the nut 6. The nut 6 is formed with a circumferential groove 14 in the outer circumference of its leading end portion 13 at the side of the spindle 1 so that the balls 5 can be brought into engagement with the circumferential groove 14 when they are pushed and moved inwardly in the radial direction of the holder body 2 by the smaller diameter portion 22 of the inner circumference 9. Thus, the nut 6 is coupled to the holder body 2 through the balls 5. Incidentally, the adjustable adaptor 11 is coupled in a driving force transmitting relationship to the spindle 1 through a not-shown mechanism.

Figure 2:
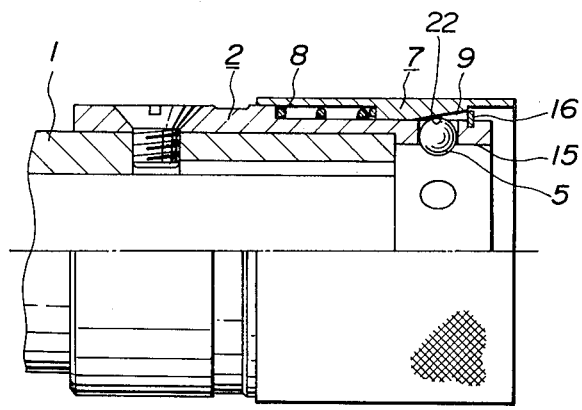
FIG. 2 (PRIOR ART) is a longitudinally sectional side elevation showing the condition under which the nut of the holder shown in FIG. 1 is removed.

When it is intended to replace the tool such as the drill, the sleeve 7 is moved in the leftward direction, as viewed in the drawing, against the action of the coil spring 8 so that the balls 5 are escaped onto the inner circumference of larger diameter 21 until they are released from the engagement with the circumferential groove 14, whereby the nut 6 is ready for removal from the holder body 2. When the Operator removes the nut 6 and detaches his hand from the sleeve 7, the sleeve 7 is returned to its initial position, as shown in FIG. 2 (PRIOR ART), by the action of the coil spring 8, so that the balls 5 are pushed inwardly in the radial direction from the inner circumference 15 of the holder body 2 by the pushing force of the smaller diameter portion 22 of the conical inner circumference 9. Incidentally, reference numeral 16 indicates a stop ring for preventing the sleeve 7 from coming out.

Even if it is intended to attach the tool 10, the nut 6 cannot be inserted, as it is shown in FIG. 2, because the balls 5 are left in abutment contact with the inner circumference of smaller diameter 22 so that they cannot be moved radially outwardly while taking their inwardly protruding positions. As a result, the nut 6 cannot be inserted into the holder body 2 before the sleeve 7 is moved in the leftward direction thereby to set the balls 5 free.

Figure 3:
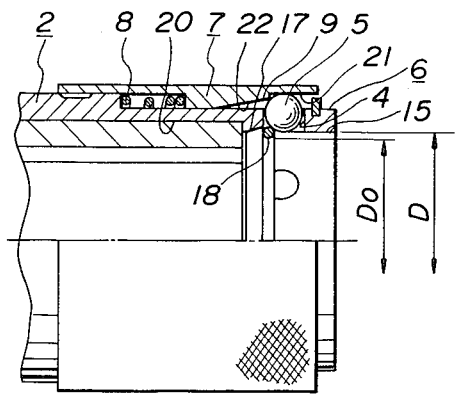
FIG. 3 is a longitudinally sectional side elevation corresponding to FIG. 2 but shows one embodiment of the present invention.
Figures 4A, 4B:
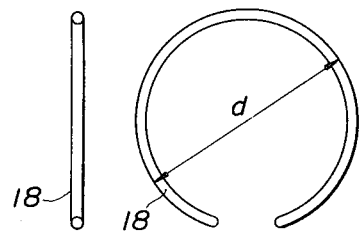
FIGS. 4(a) and 4(b) are a sectional and a front elevation view showing a ring spring, respectively.
Figure 5:
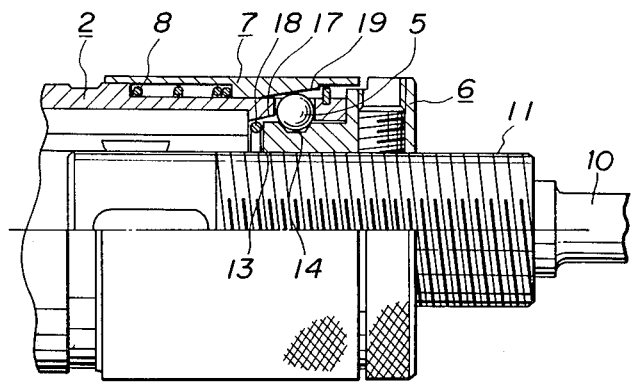
FIG. 5 is a longitudinally sectional side elevation of the embodiment of the present invention but shows the condition under which the nut is mounted.

Turning now to FIGS. 3 to 6, the present invention will be described in conjunction with the embodiments thereof. The elements equivalent to those appearing in FIGS. 1 and 2 are indicated at idential numerals, and their repeated explanations are omitted. FIG. 3 shows one embodiment of the present invention and the condition of the cylindrical holder body 2, under which the sleeve 7 is moved in the leftward direction so that the nut 6 is removed. The portion of the holder body 2, which merges into the radial through holes 4, at the side of the spindle of the machine tool is formed with a conical inner circumference 17, which is widened toward the through holes 4, i.e., diverged to the outside. A ring spring 18 as shown in FIGS. 4(a) and 4(b) which is compressible inwardly in a radial direction, as inserted such that it is inscribed with that outwardly diverging conical inner circumference 17. The ring spring 18 has a larger diameter d than the diameter D of the inner circumference 15 of the nut receiving portion of the holder body 2 so that it is fitted under radially inward compression in the inner circumference 17. Thus, when the sleeve 7 is moved in the leftward direction, as viewed in the drawing, the ring spring 18 is allowed to expand radially outwardly on the inner circumference 17 by its own elastic force so that it is urged to slide toward the radial through holes 4 until it supports the balls 5 radially outwardly from the inside, as shown. As a result, the sleeve 7 is prevented from being moved in the rightward direction by the action of the coil spring 8. In this instance, incidentally, the internal diameter $D_0$ of the ring spring 18 is made smaller than the diameter D of the inner circumference 15 of the holder body 2, accordingly, of the outer circumference of the leading end portion 13 of the nut 6.

Next, in the attaching operation of the tool 10, the nut 6 is inserted into the holder body 2. Then, the end face of the leading end portion 13 of the nut 6 pushes the coil spring 18 in the leftward direction, as viewed in the drawing, i.e., in the inward direction into the conical inner circumference 17 so that the balls 5 are released from the engagement with the ring spring 18. As a result, the sleeve 7 is moved rightwardly by the action of the coil spring 8 so that the balls 5 are pushed inwardly by the conical inner circumference 9 of the sleeve 7 until they are brought into engagement with the circumferential groove 14 of the nut 6. Thus, the nut 6 is coupled to the holder body 2. In other words, the nut 6 can be attached to the holder body 2 by the single action, i.e., merely by forcing the nut 6 into the holder body 2 without any manual touch of the sleeve 7.

Figure 6:
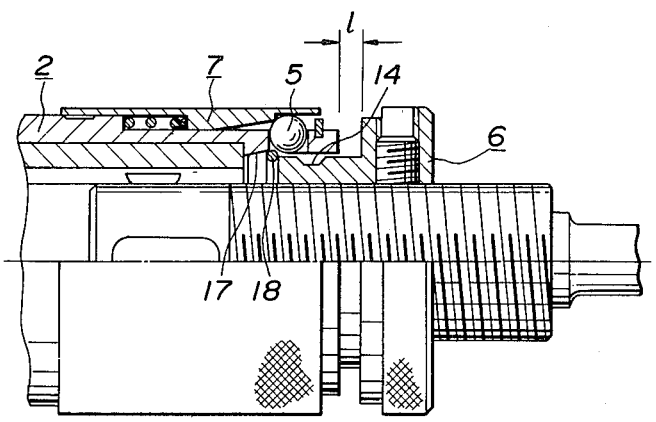
FIG. 6 is a longitudinally sectional side elevation showing the condition when the nut is being removed.

When it is intended to detach the tool 10 or the nut 6, on the other hand, the sleeve 7 is moved in the leftward direction, as viewed in FIG. 6. Then, the ring spring 18 is allowed to slide in the rightward direction on the conical inner circumference 17 of the holder body 2 by its expanding elastic force so that the nut 6 is protruded a distance l by the action of that force. Since, at this time, the balls have already been supported to the outside by the action of the ring spring 18, the condition shown in FIG. 6 is maintained, even if the Operator's hand is detached from the sleeve 7, so that the balls 5 are disengaged from the circumferential groove 14. Thus, the nut 6 can be removed without any resistance from the holder body 2. After the nut 6 has been removed, the balls 5 are pushed outwardly by the action of the ring spring 18 so that the nut 6 can be inserted again as it is.

As has been described hereinbefore, according to the present invention, the nut assembly can be left absolutely unmodified, but the inner circumference of the portion of the holder body 2, which merges into the radial through holes 4, at the side of the spindle 1 is machined into either the conical inner circumference 17 in which the spring 18 urged toward the through holes 4 is fitted. With this simple construction, the nut supporting the tool can be mounted and and demounted without any difficulty. Thus, the present invention can aid remarkably in the improvements in the working efficiency.

What is claimed is:

1. A quick-change holder comprising:
    a cylindrical body of sleeved shape having one end fixed to the spindle of a machine tool and formed with both a plurality of radial through-holes, which are arranged in a circumferential direction thereon, and a center bore which extends in the axial direction thereof;
    a plurality of balls loosely fitted in said radial through-holes, respectively, and having a larger diameter than the radial thickness of said cylindrical body at the circumferential portion where said radial through-holes are arranged;
    a nut insertable into the center bore of said cylindrical body at the other end thereof opposite to said spindle for attachment of an adaptor coupled in a driving power transmitting relationship to said spindle, said nut having its outer circumference formed with a circumferential groove, with and from which said balls can engage and disengage, so that said balls are brought into engagement with said circumferential groove when said nut is inserted into said circumferential body; and
    a sleeve mounted on said cylindrical body, said sleeve enclosing said cylindrical body, being movable in the axial direction and being urged uni-directionally in the axial direction by means of a spring, said sleeve having its inner circumference engageable with said balls and composed of portions having larger and smaller diameters, said sleeve being axially moved against the action of said spring so that said balls can be moved outwardly in the radial direction from the smaller diameter portion to the larger diameter portion of said inner circumference thereby bringing said balls into and out of free engagement with said circumferential groove whereby said nut can be mounted on and demounted from said cylindrical body,
    wherein the improvement resides in that the portion of said cylindrical body which merges into said radial through-holes and which is located at the side of said spindle is formed with a conical inner circumference which diverges to the outside; and in that a spring having free wire ends with a gap therebetween so as to be compressible inwardly in the radial direction and brought into abutment engagement with the conical inner circumference of said cylindrical body is in contact with said conical inner circumference, so that said second-named spring made engageable with said conical inner circumference is brought into abutment engagement, when said nut is not inserted, with those portions of said balls, which protrude inwardly from said radial through-holes, to push said balls outwardly in the radial direction and is thrusted, when said nut is inserted, by the leading end of said nut facing the spindle so that it is released from engagement with said balls until it is positioned on the inner conical circumference of said cylindrical body.

2. A quick-change holder as set forth in claim 1, wherein the second-named spring made engageable with the conical inner circumference of said cylindrical body is a partially cut-off ring spring which is fitted under compression in the inner conical circumference of said cylindrical body diverging toward said radial through holes.

3. A quick-change holder as set forth in claim 2, wherein said ring spring has a smaller internal diameter than the external diameter of the leading end portion of said nut at the side of said spindle.

* * * * *